US009701887B2

(12) United States Patent
Burns et al.

(10) Patent No.: US 9,701,887 B2
(45) Date of Patent: Jul. 11, 2017

(54) MULTI-COMPONENT AQUEOUS GEL SOLUTION FOR CONTROL OF DELAYED GELATION TIMING AND FOR RESULTING GEL PROPERTIES

(71) Applicant: SPI Technologies, LLC, Tulsa, OK (US)

(72) Inventors: Lyle D. Burns, Bartlesville, OK (US); Kenneth D. Oglesby, Tulsa, OK (US); Michael A. Burns, Bartlesville, OK (US)

(73) Assignee: SPI Technologies, LLC, Tulsa, OK (US)

( * ) Notice: Subject to any disclaimer, the term of this patent is extended or adjusted under 35 U.S.C. 154(b) by 42 days.

(21) Appl. No.: 14/460,009

(22) Filed: Aug. 14, 2014

(65) Prior Publication Data
US 2014/0352967 A1 Dec. 4, 2014

Related U.S. Application Data

(63) Continuation-in-part of application No. 11/564,157, filed on Nov. 28, 2006, now Pat. No. 8,822,388.

(51) Int. Cl.
*C09K 8/528* (2006.01)
*C09K 8/60* (2006.01)
*E21B 33/00* (2006.01)
*E21B 43/16* (2006.01)
*C09K 8/508* (2006.01)
*C09K 8/512* (2006.01)

(52) U.S. Cl.
CPC ............ *C09K 8/5083* (2013.01); *C09K 8/512* (2013.01)

(58) Field of Classification Search
CPC ... C09K 8/04; C09K 8/05; C09K 8/10; C09K 8/16; C09K 8/22; C09K 8/58; Y10S 507/925; Y10S 507/935
USPC ...................... 507/224, 260; 166/285, 305.1
See application file for complete search history.

(56) References Cited

U.S. PATENT DOCUMENTS

| | | |
|---|---|---|
| 1,421,706 A | 7/1922 | Van Auken Mills |
| 2,198,120 A | 4/1940 | Lerch et al. |
| 2,236,147 A | 3/1941 | Lerch et al. |
| 2,330,145 A | 9/1943 | Reimers |
| 2,402,588 A | 6/1946 | Andresen |
| 2,492,790 A | 12/1949 | Farkas |
| 2,766,130 A | 10/1956 | Dietz et al. |
| 2,827,964 A | 3/1958 | Sandiford |
| 2,968,572 A | 1/1961 | Peeler, Jr. |
| 3,028,340 A | 4/1962 | Gandon et al. |
| 3,039,529 A | 6/1962 | McKennon |
| 3,094,846 A | 6/1963 | Peeler, Jr. |
| 3,149,985 A | 9/1964 | Gandon |
| 3,202,214 A | 8/1965 | Gandon et al. |
| 3,223,163 A | 12/1965 | Koch et al. |
| 3,251,414 A | 5/1966 | Willman |
| 3,261,400 A | 7/1966 | Elfrink |
| 3,288,040 A | 11/1966 | Burrows |
| 3,294,563 A | 12/1966 | Rowland |
| 3,386,509 A | 6/1968 | Fronig |
| 3,396,790 A | 8/1968 | Eaton |
| 3,435,899 A | 4/1969 | McLaughlin et al. |
| 3,530,937 A | 9/1970 | Bernard |
| 3,581,824 A | 6/1971 | Hurd |
| 3,614,985 A | 10/1971 | Richardson |
| 3,656,550 A | 4/1972 | Wagner, Jr. et al. |
| 3,658,129 A | 4/1972 | Lanning et al. |
| 3,741,307 A | 6/1973 | Sandiford et al. |
| 3,749,172 A | 7/1973 | Hessert et al. |
| 3,759,326 A | 9/1973 | Christopher et al. |
| 3,762,476 A | 10/1973 | Gall |
| 3,785,437 A | 1/1974 | Clampitt et al. |
| 3,795,276 A | 3/1974 | Eilers et al. |
| 3,799,262 A | 3/1974 | Knight |
| 3,804,173 A | 4/1974 | Jennings |
| 3,809,160 A | 5/1974 | Routson |
| 3,876,002 A | 4/1975 | Sarem |
| 3,882,938 A | 5/1975 | Bernard |
| 3,897,827 A | 8/1975 | Felber et al. |
| 3,909,423 A | 9/1975 | Hessert et al. |
| 3,955,998 A | 5/1976 | Clampitt et al. |
| 3,965,986 A | 6/1976 | Christopher |
| 3,993,133 A | 11/1976 | Clampitt |
| 4,004,639 A | 1/1977 | Sandiford |
| 4,009,755 A | 3/1977 | Sandiford |
| 4,069,869 A | 1/1978 | Sandiford |
| 4,074,757 A | 2/1978 | Felber et al. |
| 4,091,868 A | 5/1978 | Kozlowski et al. |
| 4,098,337 A | 7/1978 | Argabright et al. |
| 4,210,206 A | 7/1980 | Ely et al. |
| 4,252,194 A | 2/1981 | Felber et al. |
| 4,257,813 A | 3/1981 | Lawrence et al. |
| 4,275,789 A | 6/1981 | Lawrence et al. |
| 4,293,440 A | 10/1981 | Elphingstone et al. |
| 4,300,634 A | 11/1981 | Clampitt |
| 4,332,297 A | 6/1982 | Sandiford |

(Continued)

*Primary Examiner* — Aiqun Li
(74) *Attorney, Agent, or Firm* — Head, Johnson, Kachigian & Wilkinson, PC

(57) ABSTRACT

A method of using a water based solution having a controllable gel time. The method includes providing a predetermined ratio of a water soluble silicate solution having at least one alkali metal, providing a predetermined ratio of a water dispersible polymer, and providing a predetermined ratio of a water soluble initiator containing a reactive carbonyl compound. One embodiment of the method also includes combining the water soluble silicate solution, the dispersible polymer, and the water soluble initiator and injecting downhole in a single stage treatment. Another embodiment of the method includes pre-mixing at least the water soluble silicate solution and the dispersible polymer into a mixture, then injecting the water soluble initiator and the mixture downhole separately for a multi-stage treatment with in situ mixing.

21 Claims, No Drawings

(56) References Cited

U.S. PATENT DOCUMENTS

| | | |
|---|---|---|
| 4,389,320 A | 6/1983 | Clampitt |
| 4,428,429 A | 1/1984 | Felber et al. |
| 4,461,644 A | 7/1984 | Childs et al. |
| 4,485,875 A | 12/1984 | Falk |
| 4,640,361 A | 2/1987 | Smith et al. |
| 4,732,213 A | 3/1988 | Bennett et al. |
| 4,744,418 A | 5/1988 | Sydansk |
| 4,836,285 A | 6/1989 | Navratil et al. |
| 5,168,928 A | 12/1992 | Terry et al. |
| 5,268,112 A * | 12/1993 | Hutchins ............ C09K 8/50 507/217 |
| 5,320,171 A | 6/1994 | Laramay |
| 5,336,315 A | 8/1994 | Cuscurida et al. |
| 6,059,035 A | 5/2000 | Chatterji et al. |
| 6,059,036 A | 5/2000 | Chatterji et al. |
| 8,822,388 B2 | 9/2014 | Burns et al. |
| 2006/0169455 A1 | 8/2006 | Everett et al. |
| 2007/0084124 A1 | 4/2007 | Brooker |
| 2008/0125334 A1 | 5/2008 | Burns et al. |

\* cited by examiner

MULTI-COMPONENT AQUEOUS GEL SOLUTION FOR CONTROL OF DELAYED GELATION TIMING AND FOR RESULTING GEL PROPERTIES

CROSS-REFERENCE TO RELATED APPLICATIONS

This application is a continuation in part of U.S. patent application Ser. No. 11/564,157, filed Nov. 28, 2006, which is incorporated herein by reference in its entirety.

BACKGROUND OF THE INVENTION

1. Field of the Invention

The present invention relates to the production of oil and natural gas. More particularly, this disclosure relates to methods for controlling the concomitant production of undesirable fluids such as water from oil and gas-bearing reservoirs, and to repair and seal pipes in production or injection wells, pipelines, and utility conduits.

2. Background of the Invention.

This disclosure relates to the production of oil and natural gas. More particularly, this disclosure relates to methods for controlling the concomitant production of undesirable fluids such as water from oil and gas-bearing reservoirs. Such produced water can be reservoir water, occasioned by coning or such similar phenomena of the aquifer or it can be injection water from secondary recovery treatments being applied to the reservoir. Whatever the source, there is an upper limit beyond which water production can no longer be tolerated and its further entry into the producing well bore must be at least reduced if further production of the hydrocarbon resources at that location is to be continued.

Regardless of whether the undesired fluid is a natural drive fluid (e.g. water) or an artificial drive fluid (e.g., from secondary recovery liquid or gas projects, gas repressurization, miscible displacement projects, etc.), the problem is primarily occasioned by the predilection of the natural or artificial drive fluid to preferentially seek the higher permeability zone and to more or less bypass the lower permeability zones.

Among the prior solutions to the problem of undesirable fluid entry is the placing or forming of a plug within the formation. At one time such plugs were of a solid nature, such as cement, regardless of whether the undesirable fluids were liquid or gas. Such solid plugs, while at least partially effective for the intended purpose, inhibit the use of the undesirable fluid to assist in driving the desired fluid from the formation into the producing well bore. In addition, the use of such solid plugs invariably results in the permanent loss of desired fluids. Further, should the undesirable fluids seep around or otherwise bypass such solid plugs, the plug cannot change or shift position to block such seepage or other changes in flow pattern of the undesired fluid.

To overcome the shortcomings of the use of solid plugs such as cement, there was developed the concept of modifying the mobility of fluids present in the subterranean formations. Such methods have generally been directed to modifying the mobility of the hydrocarbon displacing liquid medium. The mobility of any fluid in a permeable geological formation is the effective permeability of the formation to that liquid divided by the viscosity of the fluid. Thus, a commonly developed method for reducing the mobility of a particular fluid in a permeable geological formation is to increase its viscosity such as by using viscous solutions of partially hydrolyzed polyacrylamides such as described by Sandiford et al in U.S. Pat. No. 2,827,964 and McKennon U.S. Pat. No. 3,039,529.

A serious problem in the secondary recovery of oil from oil bearing or containing subterranean formations, wherein a fluid such as water is injected into the formation via one or more injection wells to drive the oil through the formation to one or more production wells, is the development of high permeability flow zones. These high permeability flow zone are known as "thief" zones and permit the drive fluid to channel directly from the injection well to the production well. In many instances, the channeling or fingering resulting from the injection well to the production well results in a low volumetric sweep efficiency. Substantial quantities of oil are left in the less permeable zones of the formation, which are bypassed in the process. Induced fractures are often the result of over-pressuring the formation at some point. In other instances, water breakthrough may be related to permeability contrasts between different layers, which may or may not be in vertical communication in the reservoir. Permeability modification treatments help improve volumetric sweep efficiency. In waterfloods, injection-well treatments are most common.

What is needed is a system and method for addressing the above, and related, issues.

BRIEF SUMMARY OF THE INVENTION

The present invention disclosed and claimed herein, in another aspect thereof, comprises a composition and method of using a water based solution having a controllable gel time. The method includes providing a predetermined ratio of a water soluble silicate solution having at least one alkali metal, providing a predetermined ratio of a water dispersible polymer, and providing a predetermined ratio of a water soluble initiator containing a reactive carbonyl compound. One embodiment of the method also includes combining the water soluble silicate solution, the dispersible polymer, and the water soluble initiator and pumping the mixture as a single stage treatment. Another embodiment of the method includes pre-mixing and pumping a mixture of at least the water soluble silicate solution and the dispersible polymer, then pumping the water soluble initiator and the mixture separately to later mix together for a multi-phase treatment.

DETAILED DESCRIPTION OF THE INVENTION

The compositions and methods discussed herein are merely illustrative of specific manners in which to make and use this invention and are not to be interpreted as limiting in scope.

While the compositions and methods have been described with a certain degree of particularity, it is to be noted that many modifications may be made in the details of the construction and the arrangement of the systems and processes without departing from the spirit and scope of this disclosure. It is understood that the compositions and methods are not limited to the embodiments set forth herein for purposes of exemplification.

In one embodiment, this disclosure teaches the combination of sodium silicate with a "reactive carbonyl" as an initiator in the presence of a polymer such as a polyacrylamide derivative containing various degrees of hydrolysis. This disclosure further teaches methods for utilizing the materials disclosed in one uniform solution of water-like viscosity placed as a single slug in the geologic formation to modify reservoir permeability, or to form a seal for fluid flows into or out of the geologic formation. This disclosure further teaches methods for utilizing the materials disclosed placed in multiple or alternating slugs in the geologic formation to modify reservoir permeability, or to form a seal for fluid flows into or out of the geologic formation. The disclosure may also be used to repair and seal leaks in pipes in production or injection wells, pipelines, utility pipes or stabilize geologic rocks and soils or other materials. Controlled time delay gelation is disclosed to produce a range of low viscosity elastic to hard ringing elastic gels.

In one embodiment, the combined use of a sodium silicate with a polymer and an initiator is premixed into a single stage fluid with a water-like viscosity. After pumping and placement, the composition thickens with time into a fluid with low viscosity up to a high viscosity hard ringing gel depending on the specific components and their respective concentrations. In one aspect, the disclosure is directed to demonstrate that the composition may be pumped into place as a single stage treatment.

In one embodiment, a sodium silicate and a polymer are pre-mixed at the surface creating a mixture. Then an initiator and the mixture are each pumped into place separately in alternating slugs as a multi-phase or multi-stage treatment. After pumping and placement, the composition thickens with time or pH level into a fluid with low viscosity up to a high viscosity hard ringing gel depending on the specific components and their respective concentrations. In one aspect, the disclosure is directed to demonstrate that the composition may be pumped into place as a multiple stage treatment.

In one embodiment of the present disclosure, the composition is a silicate, such as sodium silicate, and a polymer. The polymer may be a synthetic water-soluble or water dispersible polymer derivative of acrylamide, methacrylamide, partially hydrolyzed acrylamide, or an acrylate polymer. The polymer may be a natural polymer derivative of cellulose such as carboxymethyl cellulose, carboxymethylhydroxyethyl cellulose. The polymer may be a xanthan polymer and a "reactive carbonyl" compound with the functionality of organic carbonates such as propylene carbonate, aldehydes such as glyoxal, anhydrides such as acetic anhydride and carbon dioxide, or esters such as ethyl acetate. Various other components may be included in the formulation of the composition according to the needs of the user.

The compositions and method of the present disclosure, described in more detail below may be used for controlling the concomitant production of undesirable fluids from oil and gas bearing reservoirs and for restoring the mechanical integrity of the downhole production system or injection system for reservoirs in advanced recovery stages. The methods and compositions of the present disclosure may be used for plugging high permeability portions of subterranean formations or for permeability modification to reduce water production in favor of increased oil or gas production. Plugging ruptures, perforations or pinholes or the like in oil well casings, pipes, pipelines and utility conduits by in situ formation of a permanent fluid block in the geological formation adjacent to the rupture, perforation, pinhole or break is also contemplated. Drilling of oil and gas, geothermal, or other wells that have problem geological zones or formations that prevent the drilling process from continuing may also be addressed. Problems addressable using the composition and method of the instant disclosure include 'lost circulation or thief zones that take the drilling fluid such that the drilled cuttings cannot be removed from the well. Similarly, zones that provide a large influx of formation waters or zones that are not stabilized and slough off into the well during the drilling operation may also be addressed as will be described more fully below. Compositions and methods are providing for blocking off thief zones to thereby permit the forcing of oil from the less permeable zones by the application of fluid pressure directly to such zones, without the loss of fluid and fluid pressure through the adjacent thief zones.

The compositions and methods of the present disclosure also relate to the repair of pipe damage, holes and leaks as in oil and gas casings, pipelines, utility conduits and other pipes. Holes and leaks can develop in pipes from age (corrosion, erosion, etc.) or external damage and must be repaired for safety, environment protection and loss of product. Sometimes the pipe cannot be fully replaced and a reliable repair mechanism is needed to put the pipe back into operation. Previously such options were limited to cementing the hole or leak, but a successful pressure test after this operation is not likely. A new pipe or liner can be installed and cemented or grouted inside the damaged pipe, but a severely reduced ID results which limits future operations. An environmentally friendly liquid gel, such as that disclosed herein, could be pumped, placed across the pipe hole and out into the surrounding soils or rocks and be allowed to form a strong gel that would hold low pressures in the pipe during operations and resist chemical attack would aid in maintaining our aging infrastructure. Thus, in one embodiment, the compositions and methods of the present disclosure provides new repair mechanisms.

It is often required to plug off or seal off geological zones that thief off or take the expensive drilling fluids utilized to clean cuttings of the well and control the well pressures. The loss of this fluid prevent cleaning the drill cuttings out of well, endanger the environment by loss of control of the well or increase cost by replacement of the drill fluids. Methods to plug off geologic zones that cause problems on the other extreme end are zones that allow large volumes of formation fluids to come into the well during the drilling process and endangering well control or increasing the cost of disposal of those excess fluids. Also, some geological zones that are drilled are so unstable that a hole through them cannot be maintained due to the formation continuously falling into the hole and sticking the drill equipment in place. Methods to stabilize these formations during or after the drilling process are provided herein. Previously, cements, polymers, cellophane, ground walnut shells and epoxies have been utilized. However cements dilute and cake off before sealing, and epoxies are very expensive. The compositions and method of the present disclosure provide new plugging and sealing capabilities by mixing and pumping into place deep into the geologic zones and allowing a strong gel to set thereby holding the rock in place and sealing and plugging the flow channels.

The compositions and methods of the present disclosure also provide for the creation of an environmental containment barrier to prevent flow of containments out of a designated area. A trench can be dug to below the geologic zone of interest and the gel composition (as will be described in greater detail below) can poured or pumped, with or without mixing with soil, to form an impenetrable wall. Conversely, wells can be drilled through the geologic zone of interest with the containment and around or downstream of the containment and the gel injected into the zone of interest and allowed to set to form a barrier to flow.

Surface grouting of rocks and other materials, where the composition described herein are mixed and spread between rocks or other materials to provide a seal to flow and protect or hold the rocks and other materials in place, is also contemplated. The solution or composition may also be mixed with other solids, such as sand or cements, for additional strength and color.

Stabilization applications of the present disclosure for use with soils, gravels and other loose materials to prevent erosion or sloughing are also contemplated. Such applications can be seen in road banks where the rock bed has been cut for a road or highway path. In this application, the solution would be mixed with, spread, poured or sprayed on the loose materials and allowed to soak into the material pore space then allowed to set and form a strong gel.

Other features of the compositions and methods of the present disclosure, include, among other items: a simplified method of using a single stage treatment; a method of using a multiple stage treatment; compositions based on economical and/or environmentally friendly chemicals; plugging high permeability portions of subterranean formations for permeability modification to reduce water production in favor of increased oil or gas production; plugging ruptures, perforations or pinholes or the like in oil, gas or injection well casings, pipelines, and utility conduits by in situ formation of a permanent fluid block in the geological formation adjacent to the rupture, perforation, pinhole or break; a controlled gelation with a low water-like viscosity fluid and after in-depth pumping has subsided, thickening with time into a low viscosity, elastic gel for the purposes of permeability modification in the reservoir; controlled gelation with a low water-like viscosity fluid and after pumping has subsided, thickening with time into a high viscosity hard ringing, elastic gel for the purposes of repairing casing and pipe leaks; plugging of problem geologic zones or formations during the drilling process, where the gel solution is mixed and pumped across and into the zone of interest and allowed to gel and seal off the offending fluid flow; stabilization of subterranean geological zones during the drilling process, where the gel solution is mixed and pumped across and into the zone of interest and allowed to set and form a strong gel to hold the formation fragments, sand grains in place to allow the drilling process to continue; stabilization of surface loose materials and soils to prevent sloughing and erosion by pouring or spraying the mixed gel solution over the loose materials and allowing the liquid solution to soak into the mix and allowing the gel to set forming a strong gel holding and sealing all in place. This solution can also be pumped or pressurized into porous materials for binding, sealing, strengthening and protecting said material and thereby changing its properties and potential uses.

By way of background, application of silicates in different industrial areas is well documented. Injection of silicate solutions into reservoirs with the aim at enhancing the recovery factor through a diverting effect was proposed by Ronald Van Auken Mills in U.S. Pat. No. 1,421,706 in 1922. Acidic gel systems may be the oldest and most commonly employed techniques that employ silicates. These gels are more accurately described as precipitation type gels since they are extremely brittle with virtually no elasticity. In the early 1960's, sodium silicate and glyoxal were combined (U.S. Pat. No. 3,028,340) to make various hard cement-like coatings on substrates. At low concentrations a firm gel was obtained that lacked cohesiveness and was not as hard as cement. In 1964, Gandon et. al. (U.S. Pat. No. 3,149,985) took went a step further and cited sodium silicate reactions with other "reactive carbonyl" compounds such as polyalcohol esters to make cement like substances. One goal of these technologies was to make agents to generate very hard consolidated soils for constructing structures such as bridges, dams and water reservoirs on the soil surface. Throughout the last 50 years numerous inventors patented various sodium silicate systems (U.S. Pat. No. 2,747,670, U.S. Pat. No. 2,807,324, U.S. Pat. No. 3,435,899, U.S. Pat. No. 4,461,644, U.S. Pat. No. 4,640,361, U.S. Pat. No. 6,059,035 and U.S. Pat. No. 6,059,035 all of which patents are incorporated herein by reference) to make gels for use in plugging high permeability areas of oil and gas producing reservoirs. In the literature, an SPE Paper #13578 presented by Krumrine and Boyce ("Profile Modification and Water Control With Silica Gel-Based Systems", P. H. Krumrine and S. D. Boyce, 1985) is considered a milestone because this paper is not only a complete summary of the topic listing numerous papers and patents on sodium silicate chemistry as applied to oil field and grouting applications, but they also drew attention to a controversial fact that the silicate use was inequitably neglected in commercial applications in favor of polymer treatments in practice at the time.

Many chemicals can serve as initiators. It should be noted that the instant gel is not simply a precipitate. Metal ions such as calcium, can cause immediate precipitation of a water insoluble metal silicate. This is not a gelatinous precipitate. Many initiators are acidic, water-soluble chemicals which lower the pH of the silicate solution to a point at least below about 10. Preferably, the pH should be initially lowered to a level between about 9 and 10. Most ammonium salts of strong acids are effective. Examples include ammonium sulfate, ammonium phosphate, ammonium bicarbonate, ammonium nitrate, ammonium chloride and the like. Of these examples, the preferred initiator in the art is ammonium sulfate, principally because of its low cost.

Methods of delaying rapid reactions in the prior art involve multiple stage treatments such as pumping alternating slugs of sodium silicate and the initiator separated with inactive slugs of fresh water when the initiator reacts rapidly. This complexity allows for delayed mixing and gelatin in the formation after the mixing of the two reactants.

Although the sodium silicate technology was the first plugging and permeability modification technology largely put to practice, the use of gelled polymers based on polyacrylamide and chromium salts with reducing agents or organochromium compounds became more popular in the 1970's and 1980's because of their unique versatility to make hard and soft elastic gels rather than the inelastic gels formed using sodium silicate chemistry. Phillips Petroleum Company was a pioneer in this area and was later followed by Marathon Oil Company with similar technology using polyacrylamide-chromium gelled systems. For example, Needham in 1968, U.S. Pat. No. 3,412,793, proposed the injection of a stable foam into a high permeability formation. Other prior art proposed various gelled polymers, such as carboxyethyl and carboxymethyl cellulose (U.S. Pat. No. 3,727,687, Clampitt et al, 1973), polyacrylamides and polymethacrylamides (U.S. Pat. No. 3,749,172, Hessert et al, 1973), and various combinations and modifications of these (U.S. Pat. No. 3,762,476, Gall, and U.S. Pat. No. 3,785,437, Clampitt et al, 1974). At Marathon Oil Company, Argabright et al proposed the use of low molecular weight aldehydes as a crosslinking agent for polyacrylamide (U.S. Pat. No. 4,098,337) in 1978 and later in 1984 Falk (U.S. Pat. No. 4,485,875) proposed the use of phenol with formaldehyde as a crosslinking combination for polyacrylamides.

Crosslinked polymer treatments utilize metal ions such as chromium ($Cr^{+6}$) combined with reducing agents in the polymer solution. The polymer molecules are bonded to one another with the metal ion in a delayed fashion greatly increasing the resultant gel's ability to develop resistance to the flow of fluids in the reservoir rock. Depending on the polymer concentration, crosslinking agent and rate, a wide range of permeability adjustment is possible. The polyacrylamide concentration is usually in the range of 3000-10,000 ppm of a high molecular weight polymer. For a low molecular weight polymer the range is 20,000 to 50,000 ppm. The gelling agents consist of multivalent metals of chromium, aluminum and iron. These are used in the oxidized metal form with a suitable reducing agent such as sodium dichromate/sodium thiosulfate or a metal in the reduced form bonded to ligands such as chromium triacetate or aluminum citrate. Generally, 300-10,000 ppm oxidant to 900-30,000 ppm reductant are used per unit of polymer. Low molecular weight aldehydes such as formaldehyde and derivatives, among others, are known to crosslink polymers in concentrations ranging from 0.1-50% of polymer under acidic conditions at room temperature.

At Union Oil Company, Sandiford proposed methods (U.S. Pat. No. 3,741,307 in 1973, U.S. Pat. No. 4,004,639 in 1977, U.S. Pat. No. 4,009,755 in 1977 and U.S. Pat. No. 4,069,869 in 1978) to improve waterflooding whereby various combinations of polymer flooding with polyacrylamide and plugging of high permeability areas with sodium silicate and derivatives. In this method, following injection of enough polymer to penetrate between 20-50 feet from the wellbore, sequential slugs of chromium-polymer and the silicate technologies of the prior art are contemplated as a follow-in plug that reduces the permeability of the more permeable strata of the formation to the subsequently injected flooding media. These methods utilized two different types of gel forming systems together which contain Chromium VI—cross-linkers, polymer substrates, reducing agents to convert the Chromium VI to Chromium III, sodium silicate and acidic gelling agents for the silicates. However, when Sandiford's methods were carried out in the laboratory, it was determined that mixing these systems together (as Sandiford postulated prior to, during pumping down tubing, or in the reservoir) essentially only 1) diluted both pre-gel systems reducing quality of any gel that might form; 2) neutralized the optimum gel pH upon mixing such that no gel formation occurs; and 3) allowed other known reactions among the components to occur eliminating any gel formation. To one skilled in the art, creating the opportunity for gel component dilution, neutralization or competitive reactions to occur would not enhance water or polymer flooding productivity by creating gels to reduce permeability.

Competitive polymer gel systems are used successfully as an alternative to cement, or in combination with cement, to squeeze casing leaks and improve mechanical well integrity. They also are used instead of mechanical methods of cupped packers. Hard gels are used to hold a solid pressure in the casing or to block encroachment of foreign water into a producing well or block pressure leak off into the formation. Advantages of using polymers are two-fold. Polymers can be washed out of the wellbore after a leak is squeezed, preventing the costly rig time necessary to drill out cement. Second, since polymer solutions exert a much lower hydrostatic pressure than a cement slurry, there is less possibility of breaking down the formation and losing the squeeze. The four (4) basic commercial polymer gel systems are:

Acrylic Monomer Grout: Acrylic monomer grout is a non-toxic, yet expensive, system that is effective on tight casing leaks and pressure leak-off situations. These leaks bleed off pressure. Since the leaks are small, it is difficult to pump viscous fluids through the leak. Acrylic monomer grout pumps as a water-thin fluid, then sets up into a tough, ringing gel. Gel times can be controlled from 10 minutes to 2 hours, depending on temperature. Treatment sizes typically range from 10-25 bbl. An example of an acrylic monomer grout might be found in Clarke U.S. Pat. No. 4,094,150.

Low Molecular Weight Polymers: High concentrations of low molecular weight polymers are useful for leaks ranging from tight pressure leak-off situations to moderate leaks that can be pumped into under pressure. This system is crosslinked with standard metallic crosslinkers, or organic crosslinking systems.

High Molecular Weight Polymers: High molecular weight polymers are most effective in larger leaks, to correct channeling behind pipe, and for some lost circulation applications. The primary benefit of this system is the ability to economically block the flow of foreign water into the wellbore or block the outflow of produced fluids to thief zones. The disadvantage is that most of the crosslinkers are based on chromium, an environmentally unfriendly substance.

Cement/Polymer Combination: Squeezes are used in severe casing leaks that require mechanical integrity and are unlikely to be successfully sealed using either cement or polymer alone. On difficult leaks, such as in salt sections where multiple cement jobs are often attempted before the leak is successfully squeezed off, a small slug (25-50 bbls) of crosslinked polymer is injected ahead of the cement as a buffer to prevent the cement from washing out the squeeze section. Polymers tend to adsorb or bond to the formation while the bulk gel fills the larger voids. This action slows down cement leakoff providing the cement something to squeeze against.

Most of the prior methods and materials involve either high concentrations of silicates combined with precipitation or gelation agents utilizing complex multiple stage treatments to obtain delayed gelation or materials that involve natural or synthetic polymers with delayed crosslinking based on chromium or other toxic environmentally unfriendly metals or the combination thereof. Some of these methods have been used to seal casing leaks in lieu of using cement, although the use of toxic metals to crosslink polymers in shallow wells or stripper wells has become a problematic in light of increasing environmental sensitivity. OSHA's final standard for occupational exposure (Threshold Limit Value, TL V) to hexavalent chromium, effective May 30, 2006, has been lowered to 0.5 micrograms of Cr(VI) per cubic meter of air for handling Cr(VI) compounds in industry and shipyards. There is also a major concern regarding chromium contamination of aquifers around oil and gas wells.

In one embodiment, the present disclosure provides a single stage treatment method using the combination of a Silicate, a Polymer, and an internal Initiator (hereinafter referred to as SPI gel) that will provide environmentally acceptable and controlled gelation for the purpose of in-depth plugging of subterranean formation permeability and sealing casing leaks.

In another embodiment, the present disclosure provides a simple multiple stage treatment method using a combination of a Silicate and a Polymer mixture and injecting the combination in alternating slugs with an external Initiator and/or fresh water, brine water, or a combination thereof. This embodiment also will provide an environmentally acceptable and controlled gelation for the purpose of in-depth mixing and plugging of subterranean formation permeability and sealing casing leaks.

The methods and compositions of the present disclosure may be utilized to produce gels having desired resulting gel properties. For purposes of the present disclosure these resulting gel properties may include hard ringing, hard elastic, hard firm, weak elastic, and high viscosity. In other embodiments, gels having desired resulting gel properties may include weaker gels, or gels with a specified viscosity in parting. Desired resulting gel properties may also include a high degree of homogeneity, high strength, and/or high elasticity. Undesired gel properties may include brittleness or being subject to fracturing, weathering, or syneresis.

Uniform silicate gels of the prior art are almost impossible to prepare because the reaction is rapid. Therefore, most silicates form very rigid, non-uniform gels subject to fracturing, weathering or syneresis with concomitant shrinkage. Certain "reactive carbonyls" such as esters, amides and other derivatives disclosed by the prior art form delayed gels with sodium silicate as an improvement, but the gels are brittle without elasticity and the gels require high concentrations of materials.

On the other hand gels with polyacrylamide and the dichromate ion with a reducing agent such as sodium hydrosulfite form an elastic gel without the brittleness and other disadvantages of the silicate systems. Polyacrylamide and certain "reactive carbonyls" such as aldehydes are known to form gels at low pH and high concentrations of the reagents, but as reported, gels do not form at neutral pH.

It has been proposed that gels formed between sodium silicate and a "reactive carbonyl" are due to the ability of the "reactive carbonyl" to hydrolyze and produce hydrogen ions that lower the pH of the sodium silicate solution, and thereby causing precipitating or gelling in a delayed fashion. Examples of initiators that are said to undergo hydrolysis are the various esters and amides. Yet another mechanism proposed for sodium silicate interactions with certain "reactive carbonyls" is via the Cannizzaro reaction to yield an acid salt and an alcohol. Examples of suitable initiators of this type are aldehydes having no alpha hydrogen atoms on an $sp^3$ carbon atom such as formaldehyde, glyoxal, benzaldehyde, furfural, and trimethylacetaldehyde. If the substrate does have an alpha hydrogen atom on an $sp^3$ carbon atom, then an Aldol Condensation is the most likely reaction path, yielding a beta hydroxy aldehyde condensation product. Yet another mechanism invokes a complex redox system whereby the initiators are easily oxidized alcohols or aldehydes in combination with peroxides, persulfates, or perborates as the oxidization agent. All of these reactions occur in a highly alkaline medium with a strong base. It is of note that with the SPI gel, no gel is formed with formaldehyde at room temperature, yet good gels are formed with glyoxal ruling out a Cannizzaro type reaction.

In the laboratory, it was determined that when very low concentrations each of hydrolyzed polyacrylamide was added to sodium silicate in the presence of either glyoxal or propylene carbonate initiator, varying types of gels were formed ranging from soft gels to very hard, ringing gels with gel times of minutes to days. These preferred gels formed in this manner are more elastic in behavior like a polyacrylamide gel instead of possessing the characteristic brittleness of sodium silicate gels with an initiator. In the absence of sodium silicate, polyacrylamide (at neutral pH) did not react with glyoxal or propylene carbonate. In the absence of a "reactive carbonyl" initiator, sodium silicate did not react with polyacrylamide. However, it is known in the art that sodium silicate and the "reactive carbonyl" initiators react, but perhaps by a different mechanism to provide a gel of inferior qualities compared to that of the present disclosure.

Sodium silicate is a complicated system of various molecular weight silica polymers in an alkaline solution. Aside from requiring a certain minimum amount of buffered alkalinity, sodium silicate has no definite chemical combining numbers. When sodium silicate is acidified to a pH of less than about 10, the sodium silicate is converted partially to silicic acid. Silicic acid exists at these alkaline pH's as it is such a weak acid. Instead of precipitating and making silica, $SiO_2$, the silicic acid remains hydrated and forms a three-dimensional network in trapping the solvent water. This network is a gel since both phases are continuous. A slight lowering of the pH can occur over radical changes in gel time. Consequently, gel times can be controlled, but must prevent local acid concentrations lumping during large scale mixing.

Silicates which can be used for the compositions and processes of the present disclosure are the water soluble silicates which form silicate polymer chains or gel upon acidification. The preferred silicates are those of the alkali metals, especially sodium or potassium and combinations thereof. These silicates are commercially available as dry powders or concentrated aqueous solutions having in the range of from about 38 to 55 parts solids per hundred parts of solution and a pH in the range of from 10 to 13. Preferably, the water-soluble silicates, that are employed in the present disclosure have a molar ratio of silicon dioxide to alkali metal oxide in the range of from about 0.5:1 to about 3.5:1 and the alkali metal is sodium, potassium, and mixtures thereof. Most preferably, the ratio should be from about 3:1 to about 3.5:1.

The concentration of sodium silicate in the plugging solution can vary over a wide range from 0.05 percent to 50% and preferably between 1 to 30 percent. Preferred weaker gels are formed at the lower concentrations more suitable for permeability modification treatments of the present disclosure and preferred stronger gel plugs are formed at the higher concentrations most suitable for casing leak plugging.

The polymeric materials which are suitable for use in the practice of the compositions and methods of the present disclosure include at least one chemically non-crosslinked, water dispersible polymer selected from the group consisting of polyacrylamides and related polymers, cellulose ethers, and polysaccharides in an aqueous medium with the SPI gel initiators described herein. Unless otherwise specified, the term "polymer" is employed generically to include both homopolymers and copolymers; and the term "water dispersible polymers" is employed to include those polymers which are truly water-soluble and those which are dispersible in water or other aqueous medium, with or without a dispersant, to form stable colloidal suspensions. The polymers of the present disclosure may be used in the physical form of either a dry powder, a water concentrate or an inverse emulsion.

The polyacrylamides and related polymers which can be employed in the practice of the present disclosure include at least one water-dispersible polymer which can be used in an aqueous medium with the initiators hereinafter described to give an aqueous gel; said polymers being selected from the group consisting of: polyacrylamides and polymethacrylamides wherein up to about 75 percent of the carboxamide groups can be hydrolyzed to carboxyl groups; polyacrylamides and polymethacrylamides wherein up to about 75 percent of the carboxamide groups can be hydrolyzed to carboxyl groups; polyacrylic acid and polymethacrylic acid; polyacrylates; polymers of N-substituted acrylarnides wherein the nitrogen atoms in the carboxamide groups can have from 1 to 2 alkyl substitutents which contain from one to four carbon atoms; copolymers of acrylamide with another ethylenically unsaturated monomer copolymerizable therewith, sufficient acrylamide being present in the monomer mixture to impart said water-dispersible properties to the resulting copolymer when it is mixed with water, and wherein up to about 75 percent of the carboxamide groups can be hydrolyzed to carboxyl groups; and admixtures of such polymers. Presently preferred polyacrylamide-type polymers include the various substantially linear homopolymers and copolymers of acrylamide and methacrylamide. By substantially linear it is meant that the polymers are substantially free of crosslinking between the polymer chains. Said polymers can have up to about 75, preferably up to about 45 percent, of the carboxamide groups hydrolyzed to carboxyl groups. As used herein and in the claims, unless otherwise specified, the term "hydrolyzed" includes modified polymers wherein the carboxyl groups are in the acid form and also such polymers wherein the carboxyl groups are in the salt form, providing said salts are at least water-dispersible. Such salts include the ammonium salts, the alkali metal salts, and others which are at least water-dispersible. Hydrolysis can be carried out in any suitable fashion, for example, by heating an aqueous solution of the polymer with a suitable amount of sodium hydroxide.

Substantially linear polyacrylamides can be prepared by methods known in the art. For example, the polymerization can be carried out in aqueous mediums, in the presence of a small but effective amount of a water soluble oxygen-containing catalyst, e.g., a thiosulfate or bisulfate of potassium or sodium hydroperoxide at a temperature between about 30° and 80° C. The resulting polymer is recovered from the aqueous medium, as by drum drying, and can be subsequently ground to the desired particle size. A presently preferred particle size is such that about 90 weight percent will pass through a No. 10 mesh sieve, and not more than about 10 weight percent will be retained on a No. 200 mesh sieve (U.S. Bureau of Standards Sieve Series).

Included among the copolymers which can be used in the practice of the present disclosure are the at least water dispersible copolymers resulting from the polymerization of the major proportion of acrylamide or methacrylamide and a minor proportion of an ethylenically unsaturated monomer copolymerizable therewith. In some embodiments, it is desirable that sufficient acrylamide or methacrylamide be present in the monomer mixture to impart to the copolymer the above-described water-dispersible properties, for example, from about 10 to about 99 percent acrylamide and from about 1 to 90 percent other ethylenically unsaturated monomers. Such monomers include acrylic acid, methacrylic acid, vinyl pyrrolidone, vinyl sulfonic acid, vinyl benzyl sulfonic acid, vinyl benzene sulfonic acid, vinyl acetate, acrylonitrile, methylacrylonitrile, vinyl alkyl ether, vinyl chloride, maleic anhydride, and the like. Various methods are known in the art for preparing such copolymers, e.g., (U.S. Pat. Nos. 2,625,529; 2,740,522; 2,729,557; 2,831, 841; and 2,909,508). Such copolymers can be used in the hydrolyzed form, as discussed above for the homopolymers.

Polyacrylic acids, including polymethacrylic acid, prepared by methods known in the art can also be used in the practice of the methods and composition of the present disclosure.

Polyacrylates, e.g., as described in Kirk-Othrner, "Encyclopedia of Chemical Technology," Vol. 1, second edition, pages 305 et seq., Interscience Publishers, Inc., New York (1963), can also be used in the practice of the methods and compositions of the present disclosure. Examples of such polyacrylates include polymers of methylacrylate, ethylacrylate, n-propylacrylate, i-propylacrylate, n-butylacrylate, i-butylacrylate, t-butylacrylate, n-octylacrylate, and the like. Polyacrylate acrylamide copolymers may also be used in the practice of the methods and compositions of the present disclosure. A preferred example might include a copolymer of acrylamide and t-butyl acrylate.

Polymers of N-alkyl-substituted acrylarnides wherein the nitrogen atoms and the carboxamide groups can have from 1 to 2 alkyl substituents which contain from one to four carbon atoms can also be used in the practice of the methods and compositions of the present disclosure. Examples of such N-substituted acrylamides include, among others, N-methylacrylamide, N-propylacrylamide, N-butylacrylarnide, N,N-dimethylacrylamide, N-methyl, N-sec-butylacrylamide, and the like, at various stages of hydrolysis, as described above.

Other N-alkyl-substituted acrylamides wherein the nitrogen atoms and the carboxamide groups can have an alkyl sulfonic acid group or salt thereof may be used in the practice of the present disclosure. Examples of such substituents include the widely used 2-Acrylamido-2-Methyl-Propane Sulfonic acid (AMPS) monomer from the Lubrizol Corporation. Polymers of acrylamide and AMPS and/or vinyl pyrrolidone have better thermal and brine tolerance in oil field applications (Stahl et. al. U.S. Pat. No. 5,382,371). These polymers have become known as the Hostile Environment (HE) polymers. HE polymers are highly tolerant to hydrolysis eliminating the formation of precipitates with divalent ions such as calcium and magnesium at high temperatures up to and including 300 F. HE polymers may be crosslinked by various methods of the art and this disclosure to form excellent gels with long-term stability.

EXAMPLE 1

Introduction of 0.50 g of a water insoluble crosslinked polyacrylate SAP, AN915 from Expo Chemical Companies in Houston, Tex. directly to the inventive formulation containing 2.00 g sodium silicate, 10.00 g of a 5,000 ppm solution of Kemira's Superfloc® Anionic (SFA) 120 polyacrylamide (PAM) and 10.00 g of Bartlesville Tap Water (BTW). The mixture was shaken and 1.00 g of propylene carbonate was added and the mixture was shaken again. The procedure was a failure because the mixture never dispersed evenly in solution. The super absorbent polymer actually absorbed all of the water prior to the inventive gelling process as described herein.

EXAMPLE 2

The experiment was repeated using a carrier solvent to disperse the super absorbent polymer into the inventive mixture as for the purposes of stabilizing any post gelling water of syneresis. A gel solution was prepared in the following order of component addition with shaking between the additions: 3.50 g ethylene glycol is added to 0.50 g of SNF's AN 915 SAP; 4.00 g of sodium silicate; 15.00 g of a 5,000 ppm solution of SFA 300 High Molecular Weight (HMW) and SFA 300 Low Molecular Weight (LMW) non-ionic PAM; 20.00 g of BTW; and 1.00 g propylene carbonate was prepared. At this point a homogeneous solution formed that gelled in 35 minutes to a very hard ringing gel. The gel ringing phenomenon was observed by simply putting a slight pressure on the surface of the gel with a finger and the ringing was felt on the sides of the jar. No syneresis was observed up on setting. A portion of the gel was removed and placed in a dish with an equal weight of water. The water was absorbed by the gel.

EXAMPLE 3

The experiment was repeated using a carrier solvent to disperse the super absorbent polymer into the inventive mixture as for the purposes of stabilizing any post gelling water of syneresis. A gel solution was prepared in the following order of component addition with shaking between the additions: 2.50 g ethylene glycol is added to 0.050 g of SNF's AN 915 SAP; 4.00 g of sodium silicate; 15.00 g of a 5,000 pp solution of Kemira's SF 300 HMW and SF 300 LMW non-ionic PAM; 13.00 g of BTW; and 0.23 g propylene carbonate was prepared. At this point a homogeneous solution formed that gelled in approximately 24 hrs to a soft or weak gel without syneresis useful for permeability modification treatments. A previous sample of the same formulation made without the stabilizing amount of SAP was considered a weak gel with some water syneresis.

Representative cellulose ethers which can be used in the practice of the present disclosure include, among others, the various carboxyalkyl cellulose ethers, e.g., carboxyethyl cellulose and carboxymethyl cellulose (CMC); mixed ethers such as carboxyalkyl hydroxyalkyl ethers, e.g., carboxymethylhydroxyethyl cellulose (CMHEC); hydroxyalkyl celluloses such as hydroxyethyl cellulose and hydroxypropyl cellulose; alkylhydroxylakyl celluloses such as methylhydroxypropyl cellulose; alkyl celluloses such as methyl cellulose, ethyl cellulose, and propyl cellulose; alkylcarboxylakyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commerically in various grades. The carboxysubstituted cellulose ethers are available as the alkali metal salt, usually the sodium salts. However, the metal is seldom referred to and they are commonly referred to as CMC, CMHEC for carboxymethylhydroxyethyl cellulose etc. For example water-soluble CMC is available in various degrees of carboxylate substitution ranging from about 0.3 up to the maximum degree of substitution of 3.0. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable. CMC having a degree of substitution greater than the above-preferred ranges usually has a lower viscosity and more is required in preparing suitable aqueous compositions. Said degree of substitution of CMC is commonly designated in practice as CMC-7, CMC-9, CMC-12, etc., wherein the 7, 9, and 12 refer to a degree of substitution of 0.7, 0.9 and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

The amount of cellulose ether used in preparing the aqueous compositions used in the practice of the present disclosure can vary widely depending upon the viscosity, grade and purity of the ether and properties desired in the aqueous compositions of the disclosure. In general, the amount of cellulose ether used will be at least a water-thickening amount, i.e., at least an amount which will significantly thicken the water to which it is added. For example, amounts in the order of 25 to 100 parts per million by weight (0.0025 to 0.01 weight percent) have been found to significantly thicken water. Water containing 25 ppm of CMC has a viscosity increase of about 21 percent. At 50 ppm the viscosity increase in about 45 percent. At 100 ppm the viscosity increase is about 195 percent. Generally speaking, amounts in the range of from about 0.0025 to about 5.0, preferably from about 0.01 to about 1.5, weight percent, based on the weight of water, can be used as thickening amounts. Amounts outside these ranges can also be used. Amounts within said preferred ranges provide aqueous compositions which are better suited for the plugging operations described herein than are the more dilute or more concentrated compositions which can be prepared. Amounts of cellulose ether within the above ranges provide aqueous compositions which develop good gel strength when crosslinked in situ within the formation.

Representative of the polysaccharides which can be used in forming the polymeric compositions of this disclosure are the heteropolysaccharides produced by fermentation of carbohydrates by bacteria of the genus *Xanthomonas*. Exemplary of such heteropolysaccharides are those produced by *Xanthomonas campestris*, *Xanthomonas begonia*, *Xanthomonas phaseoli*, *Xanthomonas hederae*, *Xanthomonas incanae*, *Xanthomonas carotae*, and *Xanthomonas translucene*.

Generally, low concentrations of high molecular weight polymer correlates to lower gel strength and higher concentrations of low molecular weight polymers yields a high strength gel. It is preferred that the polymer have a molecular weight of at least 100,000. The upper limit of molecular weight is unimportant so long as the polymer is at least or can be made water dispersible. Thus, polymers having molecular weights as high as 20,000,000 or higher, and meeting appropriate conditions otherwise, can be used.

The amount of such polymers used in the practice of the disclosure can vary widely depending upon the particular polymer used, the purity of said polymer and properties desired in the resulting aqueous crosslinked compositions. In general, the amount of polymer used in preparing the aqueous compositions of the disclosure will be in the range of 0.0015 to 5, preferably 0.01 to 1.0, weight percent, based upon the weight of water or aqueous medium. However, amounts outside these ranges can be employed. The concentration of polymer is generally less than the concentrations of silica and initiator.

Blends of polymers may be used in the practice of the disclosure. It is understood that the term polymer when used in the present disclosure, may also refer to blends of polymers. For example, a blend of two or more polyacrylamides of differing molecular weights, a blend of a polyacrylamide and a cellulose ether polymer or heteropolysaccharide polymer may be used to tailor the methods of the disclosure to provide the desired gel time or gel quality. The concentration of such polymeric blends is within the ranges herein stated.

The "reactive carbonyl" initiators used in the present disclosure may fall under the broad chemical functional group categories of aldehydes, esters, amides, carbonates, anhydrides, nitriles, ketones, carbohydrates, sulfoxides, ureas, hydantoins, carbamates, lignosulfonates, low molecular weight polycarbonates, etc. to name a few. Low molecular weight polyimines such as polyethyleneimine which tend to react like a "reactive carbonyl" in a silica-polymer environment may be used in the methods of the present disclosure. More specific examples might be ethyl acetate, triacetin, ethylene carbonate, propylene carbonate, diphenyl carbonate, glyoxal, formamide, N-methyl formamide, N,N-dimethylformamide, hydantoin, methyl carbamate, diphenyl carbonate, butyrolactone, pyrrolidone, N-methylpyrrolidone, succinic anhydride, gaseous carbon dioxide, supercritical carbon dioxide, dimethyl sulfoxide, urea, ammonium lignosulfonate, polyhexamethylene carbonate diol, etc. The concentration of the initiator in the formulation of one embodiment is between 0.05 percent and 50 percent by weight and more preferably 0.1 percent to 30 percent by weight.

Blends of initiators may be used in the practice of the methods of the present disclosure. It is understood that the term initiator when used in the present disclosure, may also refer to blends of initiators. For example, a blend of two or more "reactive carbonyl" initiators of differing chemical structure whether it be different alkyl groups on a carbonate or ester to provide retardation of the reaction rate via steric hinderance or two different types of "reactive carbonyls" to allow tailoring of the gels in practice to provide the desired gel time or gel quality. The concentration of such initiator blends is within the ranges herein stated.

Other co-additives or adjuncts may be used to tailor the gel time or quality. Such adjuncts may be in the form of alkalinity additives, for example, a small portion of a strong base such as potassium or sodium hydroxide to stabilize the alkalinity of the system, a co-solvent to enhance salvation of the initiator, a dispersant to aid the use of an insoluble polymer, a small amount of a clay to affect the absorptive properties of the polymer, or other such adjuncts as apparent to one skilled in the art.

The SPI gel of the current disclosure provides a low cost silicate system that may be mixed on the surface and pumped down hole for delayed formation of strong or weak elastic, resilient "green" gels. This formulation of the present disclosure is more favorable over the previous current chromium based systems or even the original silicate systems. It has environmentally friendly, low cost chemicals and it provides a more resilient gel, controlled delayed gelation, simpler surface mixing and less labor to monitor and perform the treatment than previous technologies. The compositions of the present disclosure will allow deep penetrating treatments of oil and gas wells for long-term diversion of formation and injected waters. These treatments will reduce excess and unwanted water production from oil and gas wells resulting in operational cost savings and increased recoverable oil and gas reserves. Stiffer gels from this same basic formulation can also be prepared for casing repairs, preventing these damaged wells from being plugged and abandoned prematurely. Due to the low treatment cost and environmental friendly chemicals, it will be very cost effective for oil and gas well operators to utilize.

Prior polymer gel systems use higher concentrations of polymer compared to those of the present disclosure; and often the crosslinker systems are based on chromium or other hazardous materials. There is a strong desire for more environmentally friendly materials that are economical and have the versatility of the chromium gels for making weak and strong gels.

The gels of the present disclosure also find application in the areas of grouting and sealing of rocks and other large materials. Other applications include stabilization of soils and other loose materials for the purposes of providing strength and sealing for improved compactness, resistance to wind and water erosion, water seepage, and preventing sloughing. Other applications include the injection, pressurizing or applying the solution into the pores of a material to change its strength, permeability and other properties. Additional environmental purposes include a means for forming barriers to flow of polluting containments in the soils.

The gels of the present disclosure can also be used to repair or seal holes in buried pipelines, conduits, water or sewer or utility pipes or other buried pipes where a non-toxic, environmentally safe gel system is required to protect aquifers or ground waters. Such gels can be pumped down the line and placed across the leak and forced out the leak into surrounding soils where it can form a hard gel to seal the leak. Gels internal to the pipe can be removed by various means known to industry before the pipe is put back into service.

This present disclosure also provides methods for in situ treatment of soil contaminated with acids and/or acid-forming chemicals to minimize and/or prevent leaching there from of objectionable chemicals with subsequent acid pollution of ground and surface waters. Such is the case from coal mining waste. Such waste contains iron pyrite sulfur which is eventually oxidized to sulfuric acid. Alkali metal silicates of this type could be used to neutralize the acid mine drainage waste.

In some embodiments of the present disclosure, aspects of the silica technology (economics and environmentally attractive) are combined with aspects of the crosslinked polymer technology (elastic gels and versatility) products for casing plugging and permeability modification applications. Both soft and hard gels with elasticity are formed from the combination of the agents described herein and at low concentration.

EXAMPLE 4

Table 1 shows the delayed gel times for gels formed using sodium silicate (N-Sodium Silicate is commercially available from PQ Corporation, Valley Forge, Pa.) and glyoxal (Commercially available from BASF Corporation in Florham Park, N.J.) or propylene carbonate (Commercially available from Huntsman Chemical in Salt Lake City, Utah). These gels do not have a polymer component, but demonstrate gelation with time delay to form a hard brittle gel is possible without the use of polymer. Hard brittle gels are not considered very useful in most embodiments. Propylene carbonate is more reactive than glyoxal. At low concentrations, significant gel delay is feasible. Glyoxal was used as a 40 percent solution. The water contents from the glyoxal solution and the N-Sodium Silicate were not considered in the total water weight percent. For example, 3.00 g of N-Sodium Silicate and 3.00 g of Glyoxal were added to 6.00 g of Bartlesville Tap Water (BTW) and mixed in a sealed vial. The total water is calculated as 50 percent by weight of the total.

TABLE 1

Gel Formation with Sodium Silicate and Glyoxal or Propylene Carbonate

| Entry Number | Sodium Silicate, Wt. % | Glyoxal, Wt. % | Propylene Carbonate, Wt. % | Water, Wt. % | Gel Time | Gel Strength[1] |
|---|---|---|---|---|---|---|
| 1 | 25.00 | 25.00 | 0 | 50.00 | 12 min. | HB |
| 2 | 16.67 | 16.67 | 0 | 66.66 | 50 min. | HB |
| 3 | 34.92 | 0 | 33.33 | 31.75 | Instant | |
| 4 | 20.95 | 0 | 20.00 | 59.05 | 10 sec. | |

TABLE 1-continued

Gel Formation with Sodium Silicate
and Glyoxal or Propylene Carbonate

| Entry Number | Sodium Silicate, Wt. % | Glyoxal, Wt. % | Propylene Carbonate, Wt. % | Water, Wt. % | Gel Time | Gel Strength[1] |
|---|---|---|---|---|---|---|
| 5 | 9.52 | 0 | 9.09 | 81.39 | 5 min. | |
| 6 | 8.38 | | 4.00 | 87.62 | 50 min. | HB |
| 7 | 8.55 | 0 | 2.04 | 89.41 | >120 min. | |
| 8 | 4.71 | 0 | 1.12 | 94.17 | Overnight | HB |

[1]HB = Hard Brittle Gel

EXAMPLE 5

A 5000 ppm (0.5 wt percent) stock solution of polyacrylamide (commercial Superfloc® A-120 HMW (20% Hydrolyzed) is available from Kemira Chemicals in Atlanta, Ga. was prepared. Sodium Silicate (3.00 g), glyoxal (3.00 g) and polyacrylamide (5.00 g) stock solution were mixed in a sealed vial. The vial was observed until the sample gelled to form a hard elastic gel as indicated in Table 2, Entry 1. The water from the polyacrylamide is considered in the weight percent calculation for water.

The gels formed in Table 2 are listed in the order of increasing gel time between sodium silicate, glyoxal and polyacrylamide. Lower concentrations of sodium silicate, glyoxal and 20% hydrolyzed PAM translate into longer gel times and weaker elastic gels. PAM at 0.03 weight percent or 300 ppm PAM is one to two orders of magnitude lower polymer concentration than conventional chromium redox crosslinked polymer systems cited earlier. Typical PAM concentrations when used with chromium are in the 0.5 to 1.5 weight percent range. The silica gels with polyacrylamide are a "hybrid" between those highly elastic gels made with chromium and the brittle silicate gels made in Table 1 without polyacrylamide. The hard elastic gels shown in Table 2 would be excellent prospects for use in casing or low pressure pipeline leak plugging. Entry 8 in Table 2 took 3 to 5 days to form. This was a soft elastic gel similar to those required for permeability modification. They tend to firm slowly with time.

TABLE 2

Gel Formation With Sodium Silicate, Glyoxal and Polyacrylamide

| Entry Number | Sodium Silicate, Wt. % | PAM, (20% Hydrolysis) Wt. % | Glyoxal, Wt. % | Water, Wt. % | Gel Time | Gel Strength[1] |
|---|---|---|---|---|---|---|
| 1 | 27.27 | 0.23 | 27.27 | 45.23 | 5 min. | HE |
| 2 | 18.75 | 0.16 | 18.75 | 62.34 | 15 min. | HE |
| 3 | 18.75 | 0.31 | 18.75 | 62.19 | 30 min | HE |
| 4 | 14.29 | 0.12 | 14.29 | 71.31 | 35 sec. | HE |
| 5 | 9.38 | 0.16 | 9.38 | 81.09 | 50 min. | HE |
| 6 | 6.25 | 0.10 | 6.25 | 87.40 | 90 min. | HE |
| 7 | 4.84 | 0.05 | 4.84 | 90.27 | 120 min. | HE |
| 8 | 2.68 | 0.03 | 2.68 | 94.62 | 3-5 days | SE |

[1]HE: Hard Elastic Gel
2. SE: Soft Elastic gel that hardens slowly with time.

EXAMPLE 6

The gel entries in Table 3 are identical except for the level of PAM hydrolysis ranging between 0 to 20%. In the first entry, the PAM anionicity or level of hydrolysis is 20% (Superfloc A-120 HMW), second entry 16% hydrolysis (Superfloc A-110 HMW), the third entry 7% hydrolysis (Superfloc A-100 HMW) and the fourth entry 0% hydrolysis. The polymers are all roughly 12 million molecular weight and other properties are the same in the family of products. The data suggests the degree of hydrolysis has no effect on gel time. The non-ionic (0% hydrolysis) polyacrylamide made a hard ringing gel and the other gels at these concentrations were hard gels but they did not ring.

TABLE 3

Effect of Polyacrylamide Anionicity on Gel Formation
with Sodium Silicate and Propylene Carbonate

| Entry Number | Sodium Silicate, Wt. % | PAM Wt. % | Propylene Carbonate, Wt. % | Water, Wt. % | PAM, % Hydrolyzed | Gel Time, Minutes |
|---|---|---|---|---|---|---|
| 1 | 8.89 | 0.22 | 2.22 | 88.67 | 20 | 66 |
| 2 | 8.89 | 0.22 | 2.22 | 88.67 | 16 | 84 |
| 3 | 8.89 | 0.22 | 2.22 | 88.67 | 7 | 63 |
| 4 | 8.89 | 0.22 | 2.22 | 88.67 | 0 | 67 |

EXAMPLE 7

The data in Table 4 shows the potential to make hard elastic gels using sodium silicate, polyacrylamide and propylene carbonate with gel times up to 21.5 hours. These gels are cost effective and can be made with substantial delay times ranging from 3 to 22 hours (required for casing hole plugging) up to 5 days for the softer elastic gel as required for permeability modification.

TABLE 4

Concentration Effects on Gel Formation with Sodium
Silicate, Propylene Carbonate and Polyacrylamide

| Entry Number | Sodium Silicate, Wt. % | PAM, (20% Hydrolysis) Wt. % | Propylene Carbonate, Wt. % | Water, Wt. % | Gel Time, Minutes |
|---|---|---|---|---|---|
| 1 | 8.06 | 0.38 | 7.69 | 83.86 | 20 |
| 2 | 8.38 | 0.40 | 4.00 | 87.22 | 30 |
| 3 | 8.55 | 0.41 | 2.04 | 88.90 | 60 |
| 4 | 16.36 | 0.20 | 2.04 | 81.39 | 69 |
| 5 | 13.79 | 0.07 | 3.45 | 82.69 | 3 hrs. |
| 6 | 4.84 | 0.05 | 4.84 | 90.27 | 4 hrs. |
| 7 | 2.86 | 0.10 | 1.90 | 95.14 | 21.5 hrs. |
| 8 | 2.68 | 0.03 | 2.68 | 94.62 | 20.6 hrs. |
| 9 | 1.42 | 0.01 | 1.42 | 97.16 | 5 days |

EXAMPLE 8

Gels made with 7.69 weight percent sodium silicate, 0.05 weight percent polyacrylamide and 5.13 weight percent of various functional group reactive carbonyl initiators are shown in Table 5. Phenyl carbamate, $H_2NCO_2C_6H_5$, formed a hard elastic ringing gel within 12 minutes. Hydantoin or 2.4-Imidazolinedione shown below also acts an initiator to gel the silicate-polymer system.

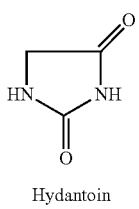

Hydantoin

Triacetin or glyceryl triacetate, $(CH_3CO_2CH_2)_2CHO_2CCH_3$ forms a gel with almost twice the delay of propylene carbonate. γ-Butyrolactone gels in about the same time as propylene carbonate. It was found that formaldehyde does not gel and acetic anhydride has a gel delay of 12-18 hours.

TABLE 5

Effects on Sodium Silicate and Polyacrylamide Gel Formation with Different Initiators
Formula: 7.69 wt % Sodium Silicate; 5.13 wt % Initiator; 0.05 wt % PAM; 87.13% BTW

| Entry No. | Initiator | Gel Time, Min. | Comments |
|---|---|---|---|
| 1 | Ethylene Carbonate | 27 | Hard Elastic Ringing Gel |
| 2 | Propylene Carbonate | 27 | Hard Elastic Ringing Gel |
| 3 | Diphenyl Carbonate | Insoluble | |
| 4 | Poly(hexamethylenecarbonate) diol | Insoluble | |
| 5 | Phenyl Carbamate | 12 | Hard Elastic Ringing Gel |
| 6 | Hydantoin | 17 | Hard Elastic Ringing Gel |
| 7 | γ-Butyrolactone | 34 | Hard Elastic Ringing Gel |
| 8 | Triacetin | 61 | Hard Elastic Ringing Gel |
| 9 | Ethyl Acetate | 60 | Hard Elastic Ringing Gel |
| 10 | Formaldehyde, 37% | Soluble | No Gel |
| 11 | Acetic Anhydride | >12 hrs. | Hard Elastic Gel |
| 12 | Ethyl-3-hydroxybutyrate | Insoluble | |

Sodium silicate and PAM are stable in solution together for months without forming a gel, however the PAM level of hydrolysis may increase with time. Thus, these two components may be pre-mixed and the initiator added just prior to pumping downhole when practicing methods of the present disclosure in the field. Likewise, PAM and the initiators form a stable mixture without gelation allowing these two entities to be premixed in the field. Sodium silicate and the initiators form a brittle gel with a relatively short gel time as in Example 4.

EXAMPLE 9

The pH of the polymer stock solutions was raised by the addition of 0.1 M sodium hydroxide. For a composition containing 6.15 weight percent N-Sodium Silicate, 1.54 weight percent propylene carbonate, and 0.04 weight percent SF-120 polyacrylamide, the pH of the polymer solution ranged from 5.5 to 8.5 extending the gel times from 6 to 48 hours as shown in Table 6.

TABLE 6

Effect of pH on Gel time of Silica-PAM-Initiator Gels

| Entry Number | pH Polymer Soln. | Gel Time, Hrs. |
|---|---|---|
| 1 | 5.5 | 6 |
| 2 | 6.5 | 7 |
| 3 | 7.5 | 9 |
| 4 | 8.5 | 48 |

EXAMPLE 10

The tolerance to KCl brine was determined on a base solution of 4.00 g N-sodium silicate, 15.00 g of a 5,000 ppm of a 50/50 blend of SF N-300 LMW polyacrylamide solution, 1.00 g of ethyl acetate, and 20.00 grams BTW water containing the amounts of KCl shown in Table 7.

TABLE 7

Effect of KCl brine on SPI Gel

| Entry No. | KCl Amt., g | KCl Wt. Percent | Gel Time | Comments |
|---|---|---|---|---|
| 1 | 0 | 0 | 5 hrs. | HE[1] Ringing Gel, No Syneresis |
| 2 | 0.25 | 0.75 | 2 hrs. | Firm, Elastic, Very Slight Syneresis |
| 3 | 0.50 | 1.50 | 65 min. | Soft Elastic Gel, Slight Syneresis |
| 4 | 0.75 | 2.25 | 50 min. | Soft Elastic Gel, Slight Syneresis |
| 5 | 1.00 | 3.00 | 45 min. | Soft Elastic Gel, Slight Syneresis |

[1]HE = Hard Elastic

As shown in Table 7 above, the addition of KCl significantly reduces the gel time for solutions where propylene carbonate is the initiator, but other slower acting initiators will allow extended gel times.

EXAMPLE 11

Different polymer types were used to form gels using a base formulation of 4.00 g of sodium silicate, 20.00 g of a 2,500 ppm polymer solution, and 1.00 g of propylene carbonate. This corresponds to 8.89 weight percent sodium silicate, 2.22 weight percent propylene carbonate, 0.11 weight percent of polymer and 88.78 weight percent water.

Drispac® polymer and HE® polymers are available from Drilling Specialties Company, Houston, Tex. Drispac® polymer is a 0.9 degree of substitution carboxymethylcellulose polymer. HE 100 is a copolymer of AMPS (sodium salt of 2-Acrylamido-2-Methyl Propane Sulfonic acid) and acrylamide. HE 300 polymer is a copolymer of VP (Vinyl Pyrrolidone) and Acrylamide. AC 254S is Alcoflood 254S available from CIBA Specialty Chemicals Water Treatment Inc., in Sulfok, Va. It is a 250,000 molecular weight polyacrylamide with 7 percent hydrolysis. Natrosol 250HHR is a hydroxyethylcellulose (HEC) non-ionic polymer available from Hercules Aqualon in Wilmington, Del. Kelzan® XC polymer is available from Kelco Oilfield Group, Houston, Tex. Goodrite® polymers are available from B F Goodrich Specialty Chemicals in Cleveland, Ohio.

TABLE 8

Effect of Polymer Type on SPI Gel

| Entry No. | Polymer | Polymer Type | Gel Time | Comments |
|---|---|---|---|---|
| 1 | Drispac ® polymer | CMC-9 | 10 min. | Very Brittle Gel, Severe Syneresis |
| 2 | HE ® 100 polymer | AMPS/AM | 13 min. | Hard Elastic Gel |
| 3 | Natrosol ® 250HHR | HEC | 4 min. | Hard Elastic Gel |
| 4 | HE ® 300 polymer | VP/AM | 10 min. | Hard Elastic Gel |
| 5 | AC254S | PAM 7% Hydrolysis | 12 min. | Hard Elastic Ringing Gel |
| 6 | Kelzan XC polymer | Xanthan Gum | 9 min. | Hard Elastic Gel |
| 7 | Goodrite 732 | Polyacrylic Acid Mwt 5000, pH = 2.62 | 10 min. | Very Hard Elastic Gel |
| 8 | Goodrite 766 | Sodium Polymethacrylate MWt 5000, pH = 8.5 | 10 min. | Very Hard Elastic Gel |

EXAMPLE 12

The data in Table 9 shows the potential to make good hard and weak elastic gels using sodium silicate, polyacrylamide and different initiators at elevated temperatures. Gel times are shortened at elevated temperatures as expected.

TABLE 9

Effect of Elevated Temperature On SPI Gels

| Entry No. | Sodium Silicate, Wt. % | PAM, (20% Hyd) Wt. % | Initiator Wt. % | Water, Wt. % | Temperature ° F. | Gel Time, Minutes | Gel Description |
|---|---|---|---|---|---|---|---|
| 1 | 2.50 | 0.01 | A | 95.00 | RT | 420 | Hard Elastic |
| 2 | 2.50 | 0.01 | A | 95.00 | 140 | 88 | Hard Elastic |
| 3 | 32.50 | 0.01 | B | 95.00 | 200 | 80 | Weak Elastic |
| 4 | 2.50 | 0.01 | C | 95.00 | 200 | 48 | Weak Elastic |
| 5 | 16.00 | 0.10 | D | 79.90 | RT | No Gel | |
| 6 | 16.00 | 0.10 | D | 79.90 | 200 | 180 | Weak Elastic |

Initiators:
A = 2.50 weight percent propylene carbonate
B = 2.50 weight percent ethyl acetate
C = 2.50 weight percent triacitin
D = 4.00 weight percent formaldehyde

EXAMPLE 13

Pressure extrusion tests were performed to provide a measure of gel strength of the SPI gels of the present disclosure. The test was performed in pressurized cylinder with air pressure used to push a piston to force the gel through a small hole at the other end. A steel cylinder fitted with screw caps on each end was constructed. One end of the cylinder had a 3/16 inch hole to extrude the gel under pressure. The cylinder had a piston fitted with an o-ring located inside the cylinder and a guide rod that connects to the piston on one end and the rod extends through a hole in the other end of the cylinder cap. The piston moved freely. The guide rod cap also has a fitting whereby the cylinder can be pressurized with air to force the piston to the other end of the cylinder.

The SPI gel components were placed in the cylinder through the 3/16 inch hole and left for 48 hours to form a hard rigid gel. After 48 hours, the cylinder was mounted with the 3/16 inch hole supported over a beaker to collect the extruded gel. The pressure inlet was connected to a source of compressed air. The pressure was slowly increased to the point whereby the piston starts to push against the gelled system and extrude through the 3/16 inch hole and that pressure is held constant and recorded.

Two gels were tested. In one embodiment, the SPI gel of the present disclosure had a base formulation of 6.00 g of sodium silicate, 30.00 g of a 2,500 ppm polymer solution, and 1.00 g of propylene carbonate as shown in Table 10. This corresponds to 12.77 weight percent sodium silicate, 2.13 weight percent propylene carbonate, 0.16 weight percent of polymer and 84.95 weight percent water. In the second embodiment, the gel was a standard polyacrylamide/CMC {0.30% PAM/0.7% CMC} blended gel at 10,000 ppm total polymer concentration crosslinked with $Cr^{+3}$ ions as per Phillips Petroleum (U.S. Pat. No. 4,043,921) using 0.15 sodium dichromate and 0.20 weight percent sodium bisulfite. The SPI gel with comparable material cost to Phillips Petroleum gel was stronger and more resistant to extrusion by a factor of 2.5-3.0 times as shown in Table 10.

TABLE 10

Gel Strength of SPI Gels Compared With the Prior Art Gels

| Type gel | Pressure to Initiate Extrusion |
|---|---|
| Phillips | 8 psi |
| Phillips | 7 psi |
| SPI | 25 psi |
| SPI | 20 psi |

A standard SPI gel composition was subjected to both a 37 API crude oil and Bartlesville water to determine if SPI gel would dilute. After 6 months exposure, the gel was not diluted by either oil or water.

EXAMPLE 14

A sample of 2,500 ppm Kemira Superfloc 120 anionic polyacrylamide was sheared in a Waring Blender for 60 seconds to a very low viscosity solution. Gels for Entries 1 and 2 of Table 11 were made using 2.00 g of sodium silicate, 10.00 g of PAM, and 0.50 g of propylene carbonate. The gels for Entries 3 and 4 of Table 11 were made by the addition of 2.00 g Sodium Silicate, 5.00 g of PAM 0.50 g of propylene carbonate and 10.00 g of BTW. The data in Table 11 indicate a 20-25 percent reduction in gel time due to the effect of shear.

TABLE 11

Effect of Shear on the SPI Gels

| Entry No. | Sodium Silicate, Wt. % | PAM, (20% Hydrolsis) Wt. % | Propylene Carbonate, Wt. % | Water, Wt. % | Polymer Sheared | Gel Time, Min. |
|---|---|---|---|---|---|---|
| 1 | 16.00 | 0.20 | 4.00 | 79.80 | No | 8 |
| 2 | 16.00 | 0.20 | 4.00 | 79.80 | Yes | 6 |
| 3 | 11.43 | 0.071 | 2.86 | 85.64 | No | 21 |
| 4 | 11.43 | 0.071 | 2.86 | 85.64 | Yes | 17 |

EXAMPLE 15

Gels made with 3.77 weight percent sodium silicate, 0.125 weight percent polyacrylamide, and 96.08% BTW with carbon dioxide used as the initiator formed a very hard elastic ringing gel within 20 minutes. The carbon dioxide initiator was bubbled into the solution for 10 minutes at 0.43 L/min., at a temperature of 20 degrees Celsius, and a pressure of 30.29 mm of Hg or 1.01 atm. This data shows the potential to make a very hard elastic ringing gel within 20 minutes using sodium silicate, polyacrylamide and the external initiator, carbon dioxide.

The present disclosure describes an aqueous mixture with controllable delayed gel time and the desired gel properties of elasticity and strength. A multitude of applications are contemplated. In one embodiment, the composition, solution, or gel in its various forms is water based and incorporates at least three components: A) a water soluble silicate solution of an alkali metal(s); B) a water dispersible polymer; and C) a water soluble initiator from the functional groups containing reactive carbonyl compounds. Thus, these three components may be pre-mixed at the surface and then pumped downhole when practicing methods of the present disclosure in the field. Accordingly, this method makes use of an initiator being internal in the mixture.

In another embodiment, a method for use of an internal initiator includes: providing a predetermined ratio of water; providing a desired concentration of water dispersible polymer; providing a desired concentration of water soluble silicate solution of an alkali metal to create a mixture; providing other desired additives to the mixture; providing a water soluble initiator from the functional groups containing carbonyl compounds to the mixture; providing water to the mixture until a desired concentration is achieved; injecting the mixture downhole; injecting displacement fluid downhole to force the mixture to a required distance into a reservoir.

In another embodiment, a method for use of an internal initiator includes: providing a predetermined ratio of water; providing a desired concentration of water dispersible polymer; providing a water soluble initiator from the functional groups containing carbonyl compounds to the mixture; providing a desired concentration of water soluble silicate solution of an alkali metal to create a mixture; providing other desired additives to the mixture; providing water to the mixture until a desired concentration is achieved; injecting the mixture downhole; injecting displacement fluid downhole to force the mixture to a required distance into a reservoir.

In another embodiment, a method for use of an internal initiator includes: providing a predetermined ratio of water; providing a desired concentration of water soluble initiator from the functional groups containing carbonyl compounds; then separately providing a desired concentration of water dispersible polymer; providing a desired concentration of water soluble silicate solution of an alkali metal to create a mixture; providing other desired additives to the mixture; injecting the mixture downhole; injecting displacement fluid downhole to force the mixture to a required distance into a reservoir.

It will be further appreciated that in one embodiment, the composition, solution, or gel in its various forms is water based and incorporates desired concentrations of component A and component B being pre-mixed at the surface and the desired concentration of initiator (component C) added just prior to pumping downhole when practicing methods of the present disclosure in the field.

It will be further appreciated that in one embodiment of the present disclosure, the composition, solution, or gel in its various forms is water based and incorporates at least the desired concentrations of component A and component B being pre-mixed at the surface and the desired concentration of initiator (component C) pumped downhole in alternating slugs with water solution buffers. The pre-mixed composition of component A and component B may also include other additives as desired. Such additives may be in the form of alkalinity additives, for example, a small portion of a strong base such as potassium or sodium hydroxide to stabilize the alkalinity of the system, a co-solvent to enhance salvation of the initiator, a dispersant to aid the use of an insoluble polymer, a small amount of a clay to affect the absorptive properties of the polymer, or other such adjuncts as apparent to one skilled in the art. The water solution buffers may be a fresh, low solids water solution, or a brine water solution. The water solution buffers may also be a mixture of both fresh water and brine solution. This method describes the use of an external initiator that is pumped separately from a water soluble silicate solution of an alkali metal(s) and a water dispersible polymer.

In one embodiment, when practicing methods of the present disclosure in the field, the method comprises: injecting a desired volume and concentration of an external initiator (component C); injecting a desired volume of displacement fluid, such as but not limited to a fresh, low solids water solution, a brine water solution with a desired concentration of dissolved salts, a low concentration silicate-polymer buffer, or a low concentration initiator buffer, downhole to provide temporary space between the separate stages; injecting a pre-mixed gel composition as described above with at least the desired concentrations of component A and component B downhole; injecting a desired volume of displacement fluid downhole to provide temporary space between the separate stages; injecting a desired volume and concentration of an external initiator (component C) downhole; injecting a desired volume of displacement fluid downhole. Further, the method may incorporate additional, repetitive injections or slugs. The displacement fluid may be any water solution, such as but not limited to a fresh, low solids water solution, a brine water solution with a desired concentration of dissolved salts, a low concentration silicate-polymer buffer, or a low concentration initiator buffer.

The water soluble silicate component (component A) may be further defined as an amount of a water soluble silicate solution of an alkali metal such as sodium, potassium and combinations thereof. The component A may be derived from concentrated aqueous solutions having in the range of from about 38 to 55 parts solids per hundred parts of solution and a pH in the range of from 10 to 13 and have a molar ratio of silicon dioxide to alkali metal oxide in the range of from about 0.5:1 to about 3.5:1 and most preferably, the ratio should be from about 3:1 to about 3.5:1 wherein the concentration of alkali metal silicate in the water solution can vary over a wide range from 0.05 to percent to 50 percent and preferably between 1 to 30 percent.

The polymer (component B) may be defined as an amount of a water-dispersible polymer selected from the group consisting of polyacrylamides or polymethacrylamide. The polymeric materials may also include up to about 50 percent of the carboxamide groups that can be hydrolyzed to carboxyl groups and wherein the preferred polyacrylamide-type polymers include the various substantially linear homopolymers and copolymers of acrylamide and methacrylamide wherein the copolymer contain sufficient acrylamide or methacrylamide be present in the monomer mixture to impart to the copolymer the above-described water dispersible properties. This may be, for example, from about 10 to about 99 percent acrylamide and from about 1 to 90 percent of other ethylenically unsaturated monomers including acrylic acid, methacrylic acid, methacrylate esters, vinyl pyrrolidone, vinyl sulfonic acid, vinyl benzyl sulfonic acid, vinyl benzene sulfonic acid, vinyl acetate, acrylonitrile, methylacrylonitrile, vinyl alkyl ether, vinyl chloride, maleic anhydride, and derivatives thereof. The ethylenically unsaturated monomers may include N-alkyl-substituted acrylamides wherein the nitrogen atoms and the carboxamide groups can have from 1 to 2 alkyl substituents which contain from one to four carbon atoms such as N-methylacrylamide, N-propylacrylamide, N-butylacrylamide, N,N-dimethylacrylamide, N-methyl-N-sec-butylacrylamide, and the like and other N-alkyl-substituted acrylamides. The nitrogen atoms and the carboxamide groups can have an alkyl sulfonic acid group or salt thereof such as 2-Acrylamido-2-MethylPropane Sulfonic acid. The carboxyl groups in the acrylamide or methacrylamide in the copolymer are in the acid form and also such polymers wherein the carboxyl groups are in the salt form, providing said salts are at least water-dispersible and includes the ammonium salts, the alkali metal salts, and others which are at least water-dispersible.

In another embodiment, the polymer is further defined as a specified amount of a water dispersible polymer selected from the group consisting of: polyacrylamides and polymethacrylamide. The polymeric materials may include up to about 50 percent of the carboxamide groups that can be hydrolyzed to carboxyl groups. The preferred polyacrylamide type polymers include the various substantially linear homopolymers and copolymers of acrylamide and methacrylamide wherein the copolymer contain sufficient acrylamide or methacrylamide be present in the monomer mixture to impart to the copolymer the above-described water-dispersible properties. In one embodiment this will be from about 10 to about 99 percent acrylamide and from about 1 to 90 percent of other ethylenically unsaturated monomers including acrylic acid, methacrylic acid, methacrylate esters, vinyl pyrrolidone, vinyl sulfonic acid, vinyl benzyl sulfonic acid, vinyl benzene sulfonic acid, vinyl acetate, acrylonitrile, methylacrylonitrile, vinyl alkyl ether, vinyl chloride, maleic anhydride, and derivatives thereof and ethylenically unsaturated monomers including N-alkyl-substituted acrylamides. The nitrogen atoms and the carboxamide groups can have from 1 to 2 alkyl substituents which contain from one to four carbon atoms such as N-methylacrylamide, N-propylacrylamide, N-butylacrylamide, N,N-dimethylacrylamide, N-methyl-N-sec-butylacrylamide, and the like and other N-alkylsubstituted acrylamide. The nitrogen atoms and the carboxamide groups can have an alkyl sulfonic acid group or salt thereof such as 2-Acrylamido-2-MethylPropane Sulfonic acid and wherein the carboxyl groups in the acrylamide or methacrylamide in the copolymer are in the acid form and also such polymers wherein the carboxyl groups are in the salt form, providing said salts are at least water-dispersible and includes the ammonium salts, the alkali metal salts, and others which are at least water-dispersible. The polymer used in preparing the aqueous compositions of the present disclosure may be in the range of 0.0015 to 5 and preferably in the range of 0.01 to 1.0, weight percent of the total solution.

The polymer may be further defined as an aqueous gel wherein said water-dispersible polymer is instead selected from the group consisting of cellulose derivatives represented by the various alkali metal salts of carboxyalkyl cellulose ethers such as carboxyethyl cellulose and carboxymethyl cellulose (CMC); mixed ethers such as carboxyalkyl hydroxyalkyl ethers such as carboxymethylhydroxyethyl cellulose (CMHEC); hydroxyalkyl celluloses such as hydroxyethyl cellulose and hydroxypropyl cellulose; alkylhydroxylakyl celluloses such as methylhydroxypropyl cellulose; alkyl celluloses such as methyl cellulose, ethyl cellulose, and propyl cellulose; alkylcarboxylakyl celluloses such as ethylcarboxymethyl cellulose; alkylalkyl celluloses such as methylethyl cellulose; and hydroxyalkylalkyl celluloses such as hydroxypropylmethyl cellulose; and combinations thereof with the acrylamide polymers and copolymers wherein said cellulose derivatives are present in the formulation at a level of between 0.01 to 1.5 weight percent. The polymer used in preparing the aqueous compositions of this disclosure will be in the range of 0.0015 to 5 and preferably in the range of 0.01 to 1.0, weight percent of the total solution.

In another embodiment, the polymer is further defined as an aqueous gel according to claim 1 wherein said water-dispersible polymer is instead selected from the group consisting of cellulose derivatives represented by the various alkali metal salts of carboxyalkyl cellulose ethers such as carboxyethyl cellulose and carboxymethyl cellulose (CMC); mixed ethers such as carboxyalkyl hydroxyalkyl ethers such as carboxymethylhydroxyethyl cellulose (CMHEC); hydroxyalkyl celluloses such as hydroxyethyl cellulose and hydroxypropyl cellulose; alkylhydroxylakyl celluloses such as methylhydroxypropyl cellulose; alkyl celluloses such as methyl cellulose, ethyl cellulose, and propyl cellulose; alkylcarboxylakyl celluloses such as ethylcarboxymethyl cellulose; alkylalkyl celluloses such as methylethyl cellulose; and hydroxyalkylalkyl celluloses such as hydroxypropylmethyl cellulose; and combinations thereof with the acrylamide polymers and copolymers. In one embodiment, cellulose derivatives are present in the formulation at a level of between 0.01 to 1.5 weight percent.

In another embodiment the water-dispersible polymer is instead selected from the group consisting of water-dispersible heteropolysaccharides produced by fermentation of carbohydrates by bacteria of the genus *Xanthomonas* such as *Xanthomonas campestris*, *Xanthomonas begonia*, *Xanthomonas phaseoli*, *Xanthomonas hederae*, *Xanthomonas incanae*, *Xanthomonas carotae*, and *Xanthomonas translucene* to form a Xanthan gum; and combinations thereof with the acrylamide polymers and copolymers. The heteropolysaccharide is present in the formulation at a level of between 0.01 to 1.5 weight percent.

The initiator (component C) may be further defined as an amount of a water soluble initiator from the categories of functional groups containing reactive carbonyl compounds of certain aldehydes, esters, amides, carbonates, anhydrides, ketones, carbohydrates, carbamates, ureas, hydantoins, or heteroatom substituted derivatives of reactive carbonyls from the functional groups categories of nitriles, imines, sulfoxides, sulfones, sulfonates, and lignosulfonates or alpha, beta unsaturated carbonyl derivatives, beta hydroxy carbonyl derivatives, and beta phenyl or beta phenoxy substituted carbonyls. These functional groups are located on monomeric, dimeric, trimeric and low molecular weight polymeric substrates that are at least partially water soluble. The term "reactive carbonyl" refers to the sharing of electrons (electronegativity) and reactivity of the organic carbon portion of the carbonyl with nucleophiles. Thus, for purposes of the present disclosure, it is required that the electrons are shared, and not transferred, between the carbon and the more electronegative atom (i.e. Shared: .O—(C=O)—O$^-$R Transferred: $NH_4{}^+HCO_3{}^-$). The concentration of the reactive carbonyl initiator (component C) in the water formulation is between 0.05 percent and 50 percent by weight and more preferably 0.1 percent to 30 percent by weight.

In another embodiment, the initiator is further defined as an amount of water soluble initiator from the categories of functional groups containing reactive carbonyl compounds of certain acids and acid gas anhydrides. As known to one skilled in the art, carbon dioxide ($CO_2$), also known as carbonic anhydride, is one of the simplest forms of carbonyl compounds. Preferably, carbonic acid made from carbon dioxide in gaseous, liquid or supercritical states and dissolved in water is used as the initiator. Further, it is preferable that when used as the initiator, the supercritical $CO_2$ is utilized at its supercritical pressure. Moreover, the supercritical $CO_2$ can be used as the sole initiator pumped downhole immediately prior to, or in alternating injections with the component A and component B mixture. $CO_2$ either used as an internal initiator and pre-mixed with components A and B, or used as an external initiator and injected downhole as part of a multiple stage treatment in separate alternating injections from the pre-mixed component A and B mixture, is acidic and therefore lowers the pH of the water soluble silicate component (component A) to a pH of 9-10 allowing the formation of polysilicic acid which interacts with the non-crosslinked polymer to create an elastic gel with the superior qualities described herein.

The ingredients of the compositions described herein may be combined in predetermined orders or in predetermined ratios to achieve desired results. For example, the concentration of silicate (component A) in the gel solution may be used to control gelation time and gel properties. The concentration of polymer (component B) in the gel solution may also be used to control gelation time and gel properties. Similarly, the concentration of initiator (component C) in the gel solution may be used to control gelation time and gel properties. Temperature may also be used to control gel time and gel properties of the solution. In some embodiments, divalent salt content cations may be used to control gel time and properties of the solution.

Further, the ingredients of the compositions described herein may be pre-mixed and injected in one single stage or may be separately injected downhole in multiple stages, in predetermined orders or in predetermined ratios and combinations to achieve desired results. It will be appreciated that the above described composition may be employed in various areas and in various uses where the properties of the composition are beneficial. Some examples of applications of the compositions of the present disclosure are described below, but the compositions of the present disclosure are not limited to the illustrative examples given herein. Water and the three components described above may be mixed at preset ratios and pumped as one fluid for delayed gelation. The solution may be pumped into a porous reservoir rock for delayed gelation for diversion of fluid flow, or pumped into fractures in the reservoir rock for delayed gelation.

In another embodiment, the gel fluid of water-like viscosity is pumped into an injection well to enter and block off thief zones with a delayed gel formation and thereby permit the forcing of oil from the less permeable zones by the application of fluid pressure directly to such zones, without the loss of fluid and fluid pressure through the adjacent thief zones. The gelled solution or gelling fluid may also be pumped down a well casing, displaces into and across a given depth and used to create hard gels to hold a solid pressure in the casing or to block encroachment of foreign water into a production or injection well. In still another embodiment, the solution is pumped into a well and displaced to mitigate unwanted water production from the subterranean formation in oil and gas wells by pumping the gel solution and forming a gel in the formation.

In other embodiments, the gelling fluid is pumped into a well and used to treat or repair poor cement jobs to block encroachment of foreign water into that producing or injection well. The gelling fluid may also be used to treat the subterranean formation is an environmentally friendly aqueous mixture. The solution may be mixed with loose solid materials and used as a carrier fluid to pump or transport said solid mixture or pumped into or sprayed onto a porous mixture of soil, gravel, cement, or other loose materials and allowed to set or gel and hold the mixture in place. A porous material's properties can be transformed by filling (partially or fully) its pores with the SPI gels. The gel solution can also be pumped inside a pipe and displaced across a breaks or ruptures in the pipe for sealing and/or repair.

In other embodiments, a gel fluid of a slightly thickened viscosity can be pumped into an injection well fracture to avoid leak-off into the porosity and permeability of the fracture faces. This fluid may continue to gel with a delayed nature and thereby permit the redirection of water into the zone with improved sweep efficiency.

In further embodiments, the gelling fluid is pumped into a well and used to treat or repair poor cement jobs to block encroachment of foreign water into that producing or injection well. The gelling fluid can be used to treat the subterranean formation is an environmentally friendly aqueous mixture. The solution may be mixed with loose solid materials and used as a carrier fluid to pump or transport said solid-liquid mixture.

Using the gel solution formulated for a resulting hard gel, the gel solution may pumped into or sprayed onto a porous mixture of soil, gravel, cement, or other loose materials and allowed to set or gel and stabilize said mixture in place. Such a solution could be used to immobilize fibrous materials, including hazardous materials such as asbestos. Such a solution could also be pumped inside a pipe and displaced across breaks or ruptures in said pipe for sealing, repair, and/or restoration of integrity. Typically, the gel solution of the present embodiment will be pumped into subterranean pipes. For purposes of this disclosure, the term subterranean is taken to mean buried at any depth, whether shallow or deep. The gels of the present disclosure are not limited to use in pipes at any particular depth.

The compositions, solutions, and gels of the present disclosure could also be used to isolate an environmental contamination by injecting the formulation into a series of wells to provide a barrier or environmental fence to keep the mobile containment from moving laterally or vertically. Solids may be mixed with the formulation, gelled or ungelled, to form a slurry mixture and the slurry then pumped or transported. Selective plugging of a porous formation at elevated temperatures due to geothermal or steamflood or fireflood applications or from the natural temperature gradient is also possible. Drilling operations to plug or control lost circulation zones and forming a downhole liner in pipe or across an open formation for hole stabilization or prevent fluid movement are also possible applications. Plugging off zones to reduce water influx or to reduce lost of drilling fluids, commonly called 'lost circulation' is also contemplated.

In other embodiments, the gel fluid of water-like viscosity is pumped into an injection well to enter and block off thief zones with a delayed gel formation and thereby permit the forcing of oil from the less permeable zones by the application of fluid pressure directly to such zones, without the loss of fluid and fluid pressure through the adjacent thief zones. The gelled solution or gelling fluid may be pumped down a well casing, displaces into and across a given depth and used to create hard gels to hold a solid pressure in the casing or to block encroachment of foreign water into a production or injection well. The solution may be pumped into a well and displaced to mitigate unwanted water production from the subterranean formation in oil and gas wells by pumping said gel solution and forming said gel in said formation.

The gelling fluid may be pumped into a well and used to treat or repair poor cement jobs to block encroachment of foreign fluids into that producing or injection well. The gelling fluid can be used to treat the subterranean formation with an environmentally friendly aqueous mixture. The gel could be used to isolate an environmental contamination by injecting the formulation into a series of wells to provide a barrier or environmental fence to keep the mobile containment from moving laterally or vertically. In partially gelled or ungelled form, the composition can pumped or transported into place.

Whereas, the compositions and methods have been described in relation to the preceding examples, tables, and claims, it should be understood that other and further modifications, apart from those shown or suggested herein, may be made within the scope of this invention.

What is claimed is:

1. A method of using a water based solution having a controllable gel time, the method comprising:
providing a predetermined ratio of a water soluble silicate solution having at least one alkali metal;
providing a predetermined ratio of a non-crosslinked water dispersible polymer;
providing a predetermined ratio of a water soluble initiator containing at least one organic reactive carbonyl compound other than aldehyde; and
combining the water soluble silicate solution, the dispersible polymer, and the water soluble initiator to form a single stage alkaline fluid containing the non-crosslinked polymer;
injecting the single stage alkaline fluid containing the non-crosslinked polymer into fluid flow channels;
plugging and sealing of said fluid flow channels with said single stage alkaline fluid containing the non-crosslinked polymer; and
blocking flow of fluids through said fluid flow channels with said single stage fluid containing the non-crosslinked polymer.

2. The method of claim 1, wherein the ratio of water soluble silicate solution is determined to select a gelation time of the solution and resulting gel properties.

3. The method of claim 1, wherein the ratio of polymer is determined to enhance resulting gel stability and strength.

4. The method of claim 1, wherein the ratio of initiator is determined to select a gelation time of the solution and resulting gel properties.

5. The method of claim 1, further comprising utilizing the temperature of the combined water soluble silicate solution, dispersible polymer, and water soluble initiator to control gel time of the solution and resulting gel properties.

6. The method of claim 1, wherein the step of combining the water soluble silicate solution and the dispersible polymer, and the water soluble initiator further comprises mixing the water soluble silicate solution and the dispersible polymer for pumping then pumping the remaining the water soluble initiator solution on site for a delayed mixing and gelling.

7. The method of claim 1, further comprising pumping the combined water soluble silicate solution, dispersible polymer, and water soluble initiator into a porous or fractured reservoir rock for delayed gelation, diversion, and/or plugging of fluid flow.

8. The method of claim 1, further comprising pumping the combined water soluble silicate solution, dispersible polymer, and water soluble initiator into one or more thief zones of a well.

9. The method of claim 1, further comprising pumping the combined water soluble silicate solution, dispersible polymer, and water soluble initiator into a subterranean pipe for restoration of pipe integrity.

10. The method of claim 1, further comprising applying the water soluble silicate solution, dispersible polymer, and water soluble initiator combined into the pores of materials for binding, sealing, strengthening or protecting said materials.

11. A method of using a water based solution having a controllable gel time, the method comprising:
providing a predetermined ratio of a water soluble silicate solution having at least one alkali metal;
providing a predetermined ratio of a non-crosslinked water dispersible polymer;
providing a predetermined volume of a water soluble initiator containing at least one reactive carbonyl compound;
combining the water soluble silicate solution and the dispersible polymer creating a single stage alkaline fluid composition containing the non-crosslinked polymer;
pumping a first portion of the predetermined volume of a water soluble initiator into fluid flow channels;
pumping said composition containing the non-crosslinked polymer into said fluid flow channels;
pumping a second portion of the predetermined volume of a water soluble initiator into said fluid flow channels;
plugging and sealing of said fluid flow channels with said single stage alkaline fluid composition containing the non-crosslinked polymer; and blocking flow of fluids through said fluid flow channels with said single stage fluid containing the non-cross-linked polymer.

12. The method of claim 11, wherein the ratio of water soluble silicate solution is determined to select a gelation time of the solution and resulting gel properties.

13. The method of claim 11, wherein the ratio of polymer is determined to enhance resulting gel stability and strength.

14. The method of claim 11, wherein the ratio of initiator is determined to select a gelation time of the solution and resulting gel properties.

15. The method of claim 11, wherein the at least one alkali metal is selected from the group consisting of sodium and potassium.

16. The method of claim 11, wherein the pH of the water soluble silicate-polymer solution is from about 10 to 13.

17. The method of claim 11, wherein the polymer is selected from the group consisting of polyacrylamide, polymethacrylamide and cellulosic polymers.

18. The method of claim 11, wherein the at least one reactive carbonyl compound is selected from the group consisting of esters, amides, carbonates, anhydrides, ketones, carbohydrates, carbamates, ureas, and hydantoins.

19. The method of claim 18, wherein the at least one reactive carbonyl compound is selected from carbonic acid, or carbon dioxide in a gaseous, liquid or supercritical state.

20. The method of Claim 1 wherein the non-crosslinked water dispersible polymer is less than 0.5 percent by weight of the solution.

21. The method of claim 11 wherein the non-crosslinked water dispersible polymer is less than 0.5 percent by weight of the solution.

* * * * *